(12) United States Patent
Olvera Velasco et al.

(10) Patent No.: US 11,645,445 B2
(45) Date of Patent: May 9, 2023

(54) SYSTEMS AND METHODS FOR DYNAMIC DOCUMENT VIEWING

(71) Applicant: MicroStrategy Incorporated, Tysons Corner, VA (US)

(72) Inventors: Alejandro Olvera Velasco, Falls Church, VA (US); Chuanhao Ma, Fairfax, VA (US); Amy Dina Laresch, Washington, DC (US); Keng-Fu Chu, Fairfax, VA (US); Zhili Cheng, Dunn Loring, VA (US)

(73) Assignee: MICROSTRATEGY INCORPORATED, Tyson's Corner (VA)

( * ) Notice: Subject to any disclaimer, the term of this patent is extended or adjusted under 35 U.S.C. 154(b) by 0 days.

(21) Appl. No.: 17/399,176

(22) Filed: Aug. 11, 2021

(65) Prior Publication Data

US 2023/0052079 A1    Feb. 16, 2023

(51) Int. Cl.
*G06F 40/106*    (2020.01)
*G06F 3/0485*    (2022.01)

(52) U.S. Cl.
CPC .......... *G06F 40/106* (2020.01); *G06F 3/0485* (2013.01)

(58) Field of Classification Search
CPC .............................. G06F 40/106; G06F 3/0485
See application file for complete search history.

(56) References Cited

U.S. PATENT DOCUMENTS

| | | | |
|---|---|---|---|
| 2011/0099494 A1* | 4/2011 | Yan ....................... | G06T 11/206 715/765 |
| 2016/0070434 A1* | 3/2016 | Clark ....................... | G06F 8/38 715/762 |
| 2020/0110792 A1* | 4/2020 | Tsabba .................... | G06F 40/14 |
| 2020/0372206 A1* | 11/2020 | Fialkow ................ | G06F 16/958 |
| 2020/0380060 A1* | 12/2020 | Siani Cohen ........ | G06N 3/0445 |

* cited by examiner

*Primary Examiner* — William D Titcomb
(74) *Attorney, Agent, or Firm* — Bookoff McAndrews, PLLC

(57) ABSTRACT

Disclosed are methods, systems, and computer-readable medium for dynamically displaying database containers. A container including content and a minimum display size for the document may be received. The display size of the document may be monitored. A determination that the display size of the document is less than the minimum display size may be made. A visible section and a hidden section of the document may be determined based on the display size. The visible section of the document may be displayed. A scroll feature may be activated based on a hidden section size. An indication to scroll the document in a scroll direction may be received. The visible section may be updated to an updated visible section that includes at least a portion of the hidden section. The updated visible section of the document may be displayed via the display.

18 Claims, 7 Drawing Sheets

SYSTEMS AND METHODS FOR DYNAMIC DOCUMENT VIEWING

TECHNICAL FIELD

Various embodiments of the present disclosure relate generally to methods and systems for dynamic visualization presentation and, more particularly, to methods and systems for dynamic viewing based on screen display sizes.

BACKGROUND

There is increased variability in display sizes for documents such as, e.g., software applications. Users can use multiple devices with varying screen sizes, can resize screens on a single device, and/or one or more software programs can modify screen sizes (e.g., based on user preference, displayed content, etc.). It is cumbersome and inefficient to program different interfaces for different screen sizes. For example, a developer may program a first interface for a desktop application and a second interface for a mobile application. Additionally, such programming may not be conducive to a screen size that is not previously contemplated by the developer (e.g., a newly dimensioned mobile device).

The present disclosure is directed to overcoming one or more of these above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, systems, methods, and computer-readable medium are disclosed for dynamically displaying containers. For instance, a method may include: receiving at least one container comprising content viewable via a document; receiving a minimum display size for the document; monitoring a display size of the document; determining that the display size of the document is less than the minimum display size, based on the monitoring; determining a visible section and a hidden section of the document based on the display size and based on determining that the display size of the document is less than the minimum display size, the hidden section comprising at least a portion of the at least one container; displaying the visible section of the document via a display; activating a scroll feature based on a hidden section size; receiving an indication to scroll the document in a scroll direction; updating the visible section to an updated visible section that includes at least a portion of the hidden section, based on the indication to scroll the document in the scroll direction; and displaying the updated visible section of the document via the display.

Furthermore, a system may include at least one memory storing instructions; and at least one processor executing the instructions to perform operations. The operations may include: receiving at least one container comprising content viewable via a document; receiving a minimum display size for the document; monitoring a display size of the document; determining that the display size of the document is less than the minimum display size, based on the monitoring; determining a visible section and a hidden section of the document based on the display size and based on determining that the display size of the document is less than the minimum display size, the hidden section comprising at least a portion of the at least one container; displaying the visible section of the document via a display; activating a scroll feature based on a hidden section size; receiving an indication to scroll the document in a scroll direction; updating the visible section to an updated visible section that includes at least a portion of the hidden section, based on the indication to scroll the document in the scroll direction; and displaying the updated visible section of the document via the display.

Moreover, a non-transitory computer-readable medium may store instructions that, when executed by a processor, cause the processor to perform operations. The operations may include: receiving at least one container comprising content viewable via a document; receiving a minimum display size for the document; monitoring a display size of the document; determining that the display size of the document is less than the minimum display size, based on the monitoring; determining a visible section and a hidden section of the document based on the display size and based on determining that the display size of the document is less than the minimum display size, the hidden section comprising at least a portion of the at least one container; displaying the visible section of the document via a display; activating a scroll feature based on a hidden section size; receiving an indication to scroll the document in a scroll direction; updating the visible section to an updated visible section that includes at least a portion of the hidden section, based on the indication to scroll the document in the scroll direction; and displaying the updated visible section of the document via the display.

Additional objects and advantages of the disclosed embodiments will be set forth in part in the description that follows, and in part will be apparent from the description, or may be learned by practice of the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1:
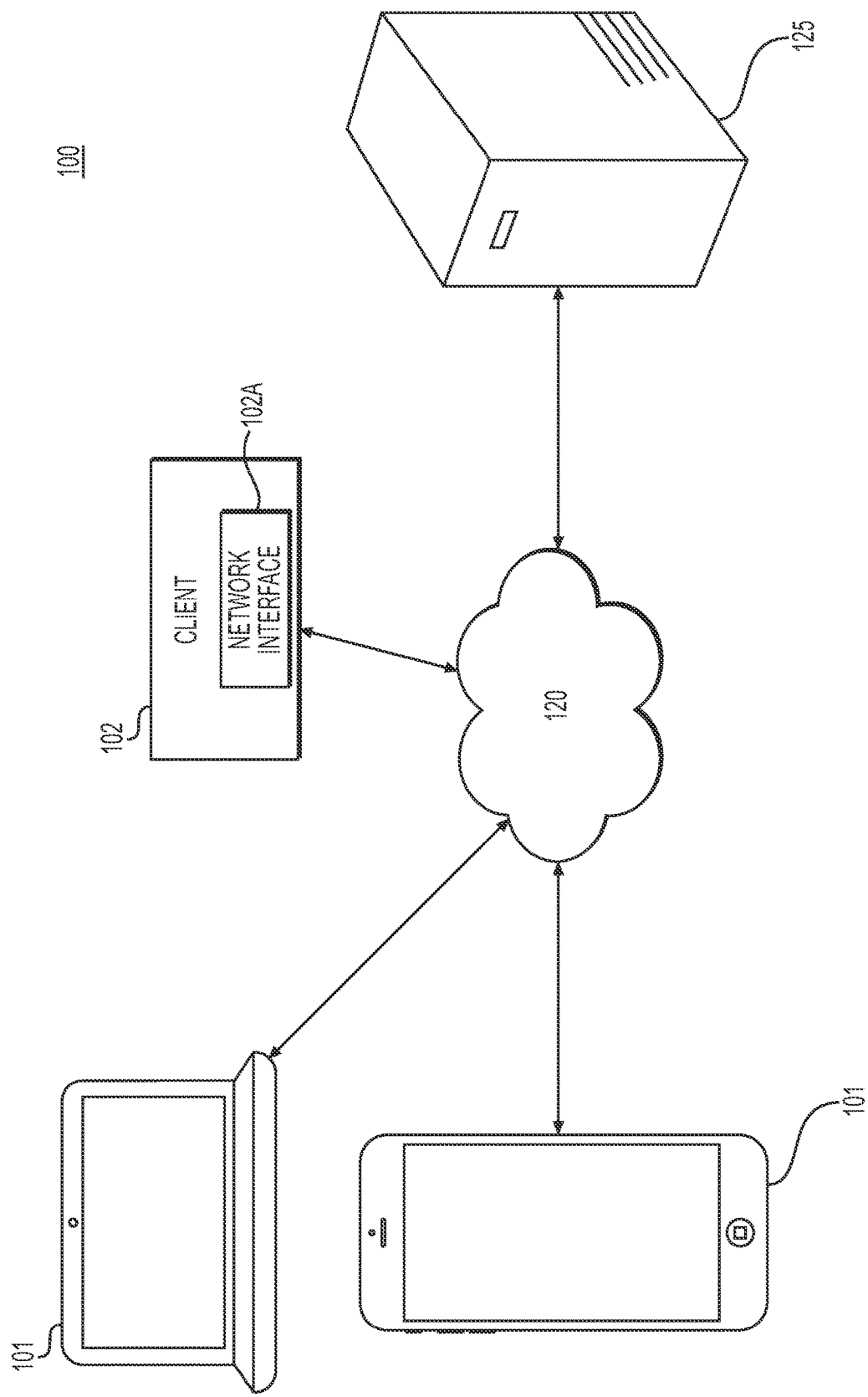
FIG. 1 depicts an exemplary block diagram of a system, according to one or more embodiments.

Various embodiments of the present disclosure relate generally to methods and systems for dynamic component visualization.

In general, the present disclosure is directed to improving display technology by dynamically displaying components based on screen properties (e.g., display size). The techniques disclosed herein reduce the number of iterations of a given document (e.g., a software application) needed by, e.g., removing the need for multiple iterations of content or designs for different screen properties (e.g., different screen sizes). The techniques disclosed herein also reduce network transmission requirements by minimizing the iterations of content (e.g., images) retrieved for a given document. For example, instead of having multiple different image resolutions of the same image stored in a database, such that different sized interfaces pull different image resolutions, a single pull may be sufficient. The single pull may obtain the content to be displayed via a document that can be different sizes. The document may be segregated into visible and hidden sections based on the document size, resulting in dynamic visibility of the content based on the document size. This configuration requires less instances of network access and pulls, thereby reducing the multiple network touches and associated inefficiencies. This configuration also prevents content congestion (e.g., overlapping content) in a given document.

Embodiments of the disclosed subject matter are directed to adjusting the amount of a given document displayed, based on the document's display size. An author may design a document (e.g., dossier, dashboard, software application, etc.) using an author portal. The document may be designed at a given display size (e.g., a resolution that presents the entire document on a single screen). The author or a machine learning model may determine a minimum display size based on the design of the document (e.g., based on the document layout). The minimum display size may be one that if a user views the document with a display size below the minimum display size, instead of congesting different containers on the document in limited space, the document extends to a hidden section and a scroll functionality is activated to scroll between different sections of the document. The hidden section changes based on a scroll amount.

The minimum display size is determined at a design stage and can ensure that a given document is displayed as designed by an author. Accordingly, a design stage based determination of a minimum display size may be preferable to a content-based display size threshold (e.g., based on a container size, image resolutions, etc.), because if a display size threshold is determined by content (e.g., for a web browser displaying a variety of websites with different content), then the container arrangements and the design of the document may unintentionally change.

As applied herein, a container may be any stand-alone or in-line item of content such as an image, a graphic, a video, a banner, a text, a visualization, an overlay, or the like, that can be displayed via a document. The container may be provided to a document from a memory or storage (e.g., a database) and/or may be fully or partially generated at the document. For example, a container may be generated based on code from a document compiler that calls for an image to be pulled from a database. The example container may be generated based on compiling the code and retrieving the image from the database. A container may be static or dynamic. A dynamic container may be updated based on a passing of time (e.g., a pre-determined amount of time) or a trigger condition (e.g., an event, update, etc.). The update may include retrieving updated content from a memory or database.

As applied herein, a display packet may be a grouping of containers for display via a document. The display packet may be stored in a given location (e.g., remote or local memory or database) and components (e.g., containers) of the display packet may be stored in different locations. The display packet may include all or a portion of the content that is displayed by a document at a given time. The display packet may also include relationships between two or more containers, as further disclosed herein. The relationships and/or metadata or other data associated with the containers included in a display packet may also be stored in the display packet or be associated with the display packet (e.g., via a separate file, via a header, etc.).

As applied herein, a document may be any dossier, dashboard, interface, display, output, or the like that can provide components (e.g., content) to a user. A document may be a webpage, an application (e.g. a software application, a mobile application, a proprietary application, etc.), a projection, a software or software implementation, a browser, or the like. The document may receive containers from one or more databases and may also receive or may be configured based on one or more display indications. The document display size of a document may be, at least in part, modifiable by a user (e.g., a resize, a snap to size, etc.). Alternatively, or in addition, the document display size may be determined based on a device (e.g., a screen size) or software application.

As applied herein, a display size may be the size of a display (e.g., a computer screen, laptop screen, monitor, mobile device screen, wearable device screen, projection, etc.) if the document is expanded a boundary of the display (e.g., if a mobile application occupies the entire screen of a mobile phone). Alternatively, the display size may be the size of a document. The side of the document may be the size that the document is displayed on the display by default, or by user selection. The size of the document may be modified (e.g., by a user, by a positioning tool, by a snap tool, or the like). As applied herein, the display size may be any applicable dimension. For example, the display size may be a resolution, a height, a width, a diagonal measurement, or the like. The display size may be measured in any applicable unit of measurement such as a number of pixels, inches, centimeters, or the like. A vertical display size and minimum display size is used throughout this disclosure as an example. It will be understood that although a vertical display size and vertical minimum display size are used as examples, any other display size (e.g., horizontal, diagonal, a resolution, etc.) may be used to perform the implementations disclosed herein.

As applied herein, a scroll feature may fluctuate between sections of a document such that a portion of the document is visible at a first time and a second portion of the document is visible at a second time after activation of the scroll feature. The scroll feature may be implemented using any applicable scroll input such as a mouse roller roll, a scroll gesture (e.g., using a touch response), a button press, a swipe, or the like. For example, a scroll function may provide the effect of moving a document up or down to pass through different sections of the document.

The embodiments disclosed herein reduce on screen congestion and reduce the need for larger displays. By applying the dynamic viewing for document sizes based on a minimum display size, a user may be provided a document as designed by an author without having to view the document on a screen that is as large as the document design screen.

FIG. 1 depicts an exemplary network environment 100 in which systems, methods and other aspects of the present disclosure may be implemented. Environment 100 may include one or more user device(s) 101 under the operation of one or a plurality of users, a network 120, and at least one server 125. As shown, a user device 101 may be a laptop, a mobile phone, and/or may be any other applicable device such as a desktop, a hand held device, a wearable device, a projector, or the like. Server 125 may act as a repository for information discoverable by the user of the user device 101. Server 125 may be a single server or may include multiple servers, databases, etc. Server 125 may provide one or more containers to documents displayed via user device 101 and/or may provide content to populate containers. Server 125 may communicate with user device 101 via a network 120. Network 120 may be any suitable network or combination of networks and may support any appropriate protocol suitable for the communication of data between various components in environment 100. Network 120 may include a public network (e.g., the Internet), a private network (e.g., a network within an organization), or a combination of public and/or private networks. Server 125 may be implemented using multiple computers that cooperate to perform the functions discussed below, which may be located remotely from each other. Server 125 may be a local server, a remote server, a cloud server, or the like. User device 101 may be operated by one or more users to access one or more documents.

A client 102 may be in communication with the user device and/or the server 125 via network 120. Network 120 may communicate with client 102 via a network interface 102A at client 102. An author portal, as disclosed herein, may be provided at client 102 such that one or more display indications are provided from client 102 (e.g., via input from a user) to a document at user device 101 or processor of user device 101.

Environment 100 may include one or more computer systems configured to gather, process, transmit, and/or receive data. In general, whenever environment 100 or components thereof is described as performing an operation of gathering, processing, transmitting, or receiving data, it is understood that such operation may be performed by a computer system thereof.

Figure 2:
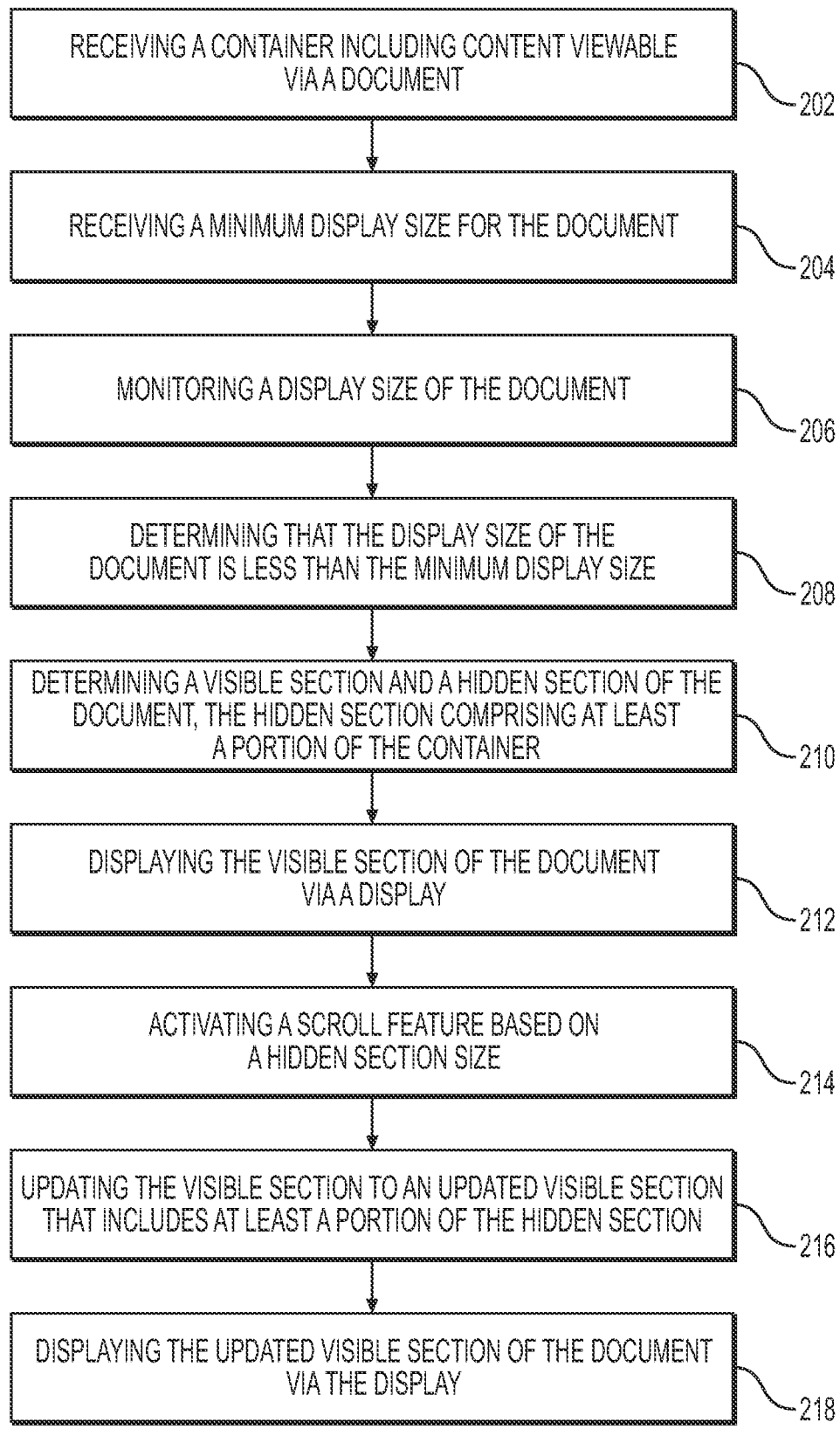
FIG. 2 depicts a flowchart for dynamic document viewing, according to one or more embodiments.

FIG. 2 depicts a flowchart 200 for dynamically displaying a document based on its display size. At 202 of flowchart 200, at least one container including content viewable via a document may be received. The at least one container may be included in a display packet that includes containers to be displayed via the document. The display packet may be received at user device 101 or at a server configured to populate a document at the user device 101. For example, the display packet with the at least one container may be received at user device 101 and may be stored in a local storage (e.g., memory, cache, etc.) for use to populate a document. Alternatively, for example, the display packet may be received at a web server that provides the content to be displayed via a document on the user device.

The display packet including the at least one container may be received based on a trigger. The trigger may be, for example, a document initiation, a user action, a preconfigured action, or the like. For example, a user may activate a software application on user device 101 and, based on the user activating the software application, the display packet including the at least one container may be retrieved from memory, cache, or from a database (e.g., server 125 via network 120). The display packet may receive the at least one container from memory, cache, or a database. Alternatively, or in addition, client 102 may provide all or a portion of the at least one container to be provided via the display packet.

At 204 of FIG. 2, a minimum display size may be received for the document for which the at least one container is received at 202. The minimum display size may be received along with the document, the container, or at any other applicable time. For example, the minimum display size may be included in a header or metadata associated with the document. Alternatively, the minimum display size may be provided independent of the document such that it is provided along with a pointer that points to the document so the minimum display size can be associated with the document.

The minimum display size may also include an indication of a dimension, orientation, and/or unit of measurement that the minimum display size corresponds to. The dimension, orientation, and/or unit of measurement may be incorporated into the minimum display size or may be provided in addition to the minimum display size (e.g., as metadata). As an example of a dimension, orientation, and/or unit of measurement may be included as digits of a binary sequence (e.g., 000101011101) where one or more digits indicate one or more of the dimension, orientation, and/or unit of measurement and one or more other digits indicate the actual minimum display size.

The minimum display size may be provided by client 102 and may be updated from time to time. Client 102 may generate the minimum display size using an author portal, as further discussed herein. An author may use the author portal to provide the minimum display size at client 102. Client 102 may then transmit the minimum display size over network 120 such that a user device 101 that displays the document can apply the minimum display size, as discussed herein.

At 206 of FIG. 2, a display size of a given document may be monitored. The display size of the document may be monitored for a current display size as well as any changes to the current display size. For example, upon initiating a document on a user device 101, at 206, the display size of the document may be monitored and an initial display size may be determined. The display size for the document may be continuously monitored such that any changes to the display size are identified via the monitoring.

The display size may be monitored by a document identifying its size. The document may report its size to an application, software, or to the user device 101 that applies the minimum display size based techniques disclosed herein, or may self-monitor its size to apply the minimum display size based techniques disclosed herein. A document's display size may be stored (e.g., in local cache). According to an implementation, a document's display size may be monitored based on periodic pings to determine a current display size at each ping. The frequency of the periodic pings may be predetermined or dynamically determined. A pre-determined frequency may be provided by an author via an author portal or may be provided by any applicable entity. A dynamically determined frequency may be determined by a machine learning algorithm. The machine learning algorithm may be trained based on, for example, previous monitoring of the document or similar documents and their respective changes in size, frequency of periodic pings, or the like. The machine learning model may output a frequency based on its training and inputs such as document properties, device(s) used to view the document, and/or the like.

The display size of a document may be monitored in pixels, widths, heights, another dimension, or the like. A given unit of measurement (e.g., pixels, inches, centimeters, etc.) may be converted to one or more other units before it is compared to a minimum display size, as discussed herein. The conversion may be conducted using any applicable processor at a user device 101 or another component.

The display size may be monitored by a user device 101 detecting the document size. A software code or program may determine the display size of a given document continuously or at predetermined or dynamically determined frequencies, as discussed above. Alternatively, or additionally, the display size of the document may be based on an amount of space that a document covers in relation to the amount of space one or more other documents cover on a display.

The display size of a document may change based on the orientation of user device 101 (e.g., landscape, portrait, etc.). Alternatively, the display size of a document may change based on a user action (e.g., a resize of a document screen, initiating or prioritizing another application, etc.). The display size of the document may be based on the portion of a display area (e.g., a screen, projection, etc.) that a document occupies.

At 208 of FIG. 2, a determination may be made that the display size of the document, as monitored at 206, is less than the minimum display size received at 204. The determination may be made by comparing the minimum display size received at 204 to the monitored display size at 206. The determination may be made by the document itself, by the user device 101, or by a different component that receives both the monitored display size and the minimum display size.

At 210 of FIG. 2, a visible section and a hidden section of the document may be determined such that the hidden section includes at least a portion of the at least one container received at 202. To determine the visible section and the hidden section, the display size may be compared to the minimum display size. The difference between the display size and the minimum display size may determine the sizes of the visible section and the hidden section.

For example, the minimum display size may be a height of 2000 pixels for a dashboard. Monitoring the display size of the dashboard may result in a determination that a current display size of the dashboard is 1100 pixels. Based on the determination that the minimum display size is larger than the current display size, a visible section and a hidden section may be determined. The visible section may correspond to the $^{1100}/_{2000}{}^{th}$ percent (i.e., 55%) of the document and the hidden section may correspond to the $^{900}/_{2000}{}^{th}$ percent (i.e., 45%) of the document. According to this example, the visible section may be the proportion of the minimum display size (i.e., 2000 pixels in this example) that corresponds to the display size (i.e., 1100 pixels in this example). Accordingly, the hidden section may be the remaining proportion of the minimum display size (i.e., $^{900}/_{2000}$ pixels). Accordingly, based on this example, the visible section plus the hidden section may correspond to the minimum display size.

Although a direct proportion such that the visible section plus the hidden section corresponds to the minimum display size is provided in the example above, it will be understood that a different proportion may be used for the visible section and hidden section. For example, a machine learning model may be used to determine the size of the visible section and/or the hidden section based on the current display size, minimum display size, one or more other dimensions or the like. Accordingly, the visible section plus the hidden section may not add up to the minimum display size.

According to an implementation, the visible section and the hidden section may include at least a portion of the at least one container received at 202. For example, if a given document includes five containers, at least a part of one of the five containers may be part of the visible section and at least a part of one of the five containers may be part of the hidden section. In this example, the same container may be part of the visible section and the hidden section.

At 212, the visible section of the document may be provided via a display. The visible section may be provided such that a user using user device 101 is able to view the visible section of the document (e.g., via user device 101 screen, projection, etc.). The visible section may initially be displayed such that visible section includes the top most part of the document. Accordingly, the user may be able to view at least the portion of the at least one container received at 202, that is part of the visible section displayed at 212.

At 214, a scroll feature may be activated. The scroll feature may be activated by the document, user device 101, or by another component. The scroll feature may be activated based on the determination of the hidden section at 210. The scroll feature may be activated so that a user is provided access to view the hidden section when the display size is less than the minimum display size.

The scroll feature may be implemented using any applicable scroll input such as a mouse roller roll, a scroll gesture (e.g., using a touch response), a button press, a swipe, or the like. For example, a scroll function may provide the effect of moving a document up or down to pass through different sections of the document.

An indication that the scroll feature is activated may be provided to a user. The indication may be a visual indication, a haptic indication, or an auditory indication. For example, the user may be provided a scroll bar to indicate that a hidden section of the document is visible by using the scroll feature. As another example, an arrow or other visual indication may be provided near or overlaid on the document to indicate a hidden section. As another example, a sound may be output from a speaker to indicate to the user that a hidden section is available. As another example, a haptic response or vibration may be present to the user to indicate that a hidden section is available.

The scroll feature may be activated by the document, user device 101, or another applicable component. Activating the scroll feature may include modifying the visible section window of the document such that upon receipt of a scroll input (e.g., user input via a mouse, gesture, swipe, etc.), the portion of the document that corresponds to a visible section may be replaced by at least a portion of the document that corresponds to a hidden section before the scroll input.

At 216, the visible section of a document may be updated to an updated visible section that includes a portion of the hidden section determined at 210. The updated visible section may or may not include a portion of the original visible section, based on the extent of the scroll input. Generating the updated visible section (e.g., scrolling in a given direction) may result in generating an updated hidden section. If the original hidden section included a contiguous section, the updated hidden section may include two or more portions (e.g., one above the visible section and one below the visible section). If the original hidden section included separated sections, the updated hidden section may include two or more portions or may be a single contiguous section.

At 218, the updated visible section of the document may be displayed via the display. The updated visible section and the updated hidden section may be considered the visible section and hidden section such that further scroll input may result in a new updated visible section and new updated hidden section. Accordingly, a user may view the entire document by using the scroll function based on modifying the visible sections and hidden sections. The user may provide scroll input to replace an updated visible section with a previous visible section to review a previously visible section of the document.

After 218, a determination may be made that that the display size of the document is greater than or equal to the minimum display size, based on the continuous monitoring at 206. For example, the document may be resized by a user or a program, or the orientation of a user device 101 may be adjusted, or a different change may be made that causes a change in the size of the document. Upon determining that the display size of the document is greater than or equal to the minimum display size, the scroll feature activated at 214 may be deactivated. Accordingly, the entire document including all the components may be provided via a display.

According to an implementation of the disclosed subject matter, one or more containers received at 202 may be resized based on the display size of the document providing the one or more containers. The one or more containers may be resized based on a first rule or set of rules if the document is larger than the minimum display size, and may be resized based on a second rule or set of rules if the document is smaller than the minimum display size. For example, if the document is larger than the minimum display size, then the one or more containers may be resized such that the one or more containers proportionally fill the space created by the document. Continuing the example, if the document is smaller than the minimum display size, then the one or more containers may resize up to a certain proportion in one specific dimension (e.g., width).

The minimum display size disclosed herein may be document specific such that an author may designate a minimum display size for each document output by an author portal. The author may determine the minimum display size based on the document design. For example, the author may determine the minimum display size based on the containers included in the display packet of the document. However, it will be understood that the minimum display size is container agnostic such that the presence of one or more containers or a property of a given container may not result in a specific minimum display size. For example, the containers of a document may occupy 1900 pixels of height combined. However, an author or a machine learning model may determine that the minimum display size is 2000 pixels for optimal aesthetic display of the document that includes the containers.

According to an implementation, a minimum display size may be updated. The minimum display size may be updated by an author or a machine learning model. The minimum display size may be updated after a document has been published by a user device 101. Accordingly, a determination may be made that a given display size of the document after the minimum display size has been updated, is less than the updated minimum display size. Based on the determination, a new visible section and new hidden section of the document may be determined based on the updated display size. The new hidden section may include at least a portion of the at least one container of the document. A scroll feature may be activated based on the new hidden section size (i.e., the scroll feature may be different than the original scroll feature based on the original minimum display size). The new visible section of the document may be displayed via the display. An indication to scroll the document in a new scroll direction may be received. It will be understood that the new scroll direction may be the same as an original scroll direction or may be different from the original scroll direction. Based on the indication to scroll in the new scroll direction. The new visible section may be updated to a new visible section that includes a portion of the new hidden section. The updated new visible section of the document may be displayed via the display.

Figure 3:
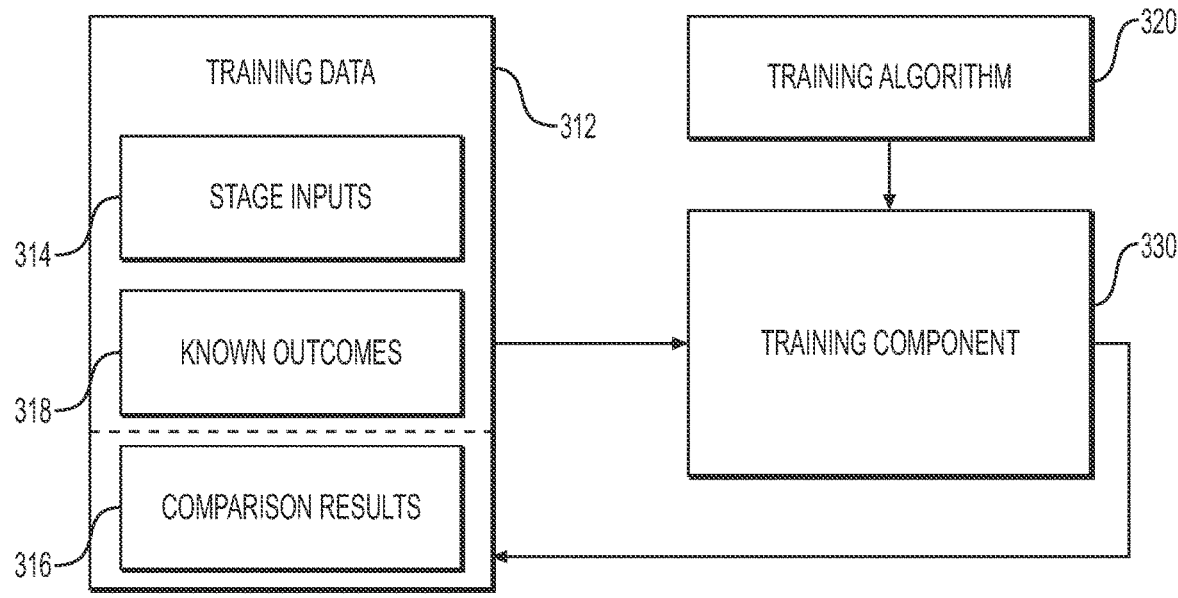
FIG. 3 depicts a data flow for training a machine learning model, according to one or more embodiments.

As disclosed, one or more implementations described herein include a machine learning model. A machine learning model disclosed herein may be trained using the data flow 300 of FIG. 3. As shown in FIG. 3, training data 312 may include one or more of stage inputs 314 and known outcomes 318 related to a machine learning model to be trained. The stage inputs 314 may be from any applicable source including minimum display sizes, display sizes, document types, container properties, etc. (e.g., one or more outputs from a step from flowchart 200 of FIG. 2). The known outcomes 318 may be included for machine learning models generated based on supervised or semi-supervised training. An unsupervised machine learning model might not be trained using known outcomes 318. Known outcomes 318 may include known or desired outputs for future inputs similar to or in the same category as stage inputs 314 that do not have corresponding known outputs.

The training data 312 and a training algorithm 320 may be provided to a training component 330 that may apply the training data 312 to the training algorithm 320 to generate a machine learning model. According to an implementation, the training component 330 may be provided comparison results 316 that compare a previous output of the corresponding machine learning model to apply the previous result to re-train the machine learning model. The comparison results 316 may be used by the training component 330 to update the corresponding machine learning model. The training algorithm 320 may utilize machine learning networks and/or models including, but not limited to a deep learning network such as Deep Neural Networks (DNN), Convolutional Neural Networks (CNN), Fully Convolutional Networks (FCN) and Recurrent Neural Networks (RCN), probabilistic models such as Bayesian Networks and Graphical Models, and/or discriminative models such as Decision Forests and maximum margin methods, or the like.

Figure 4:
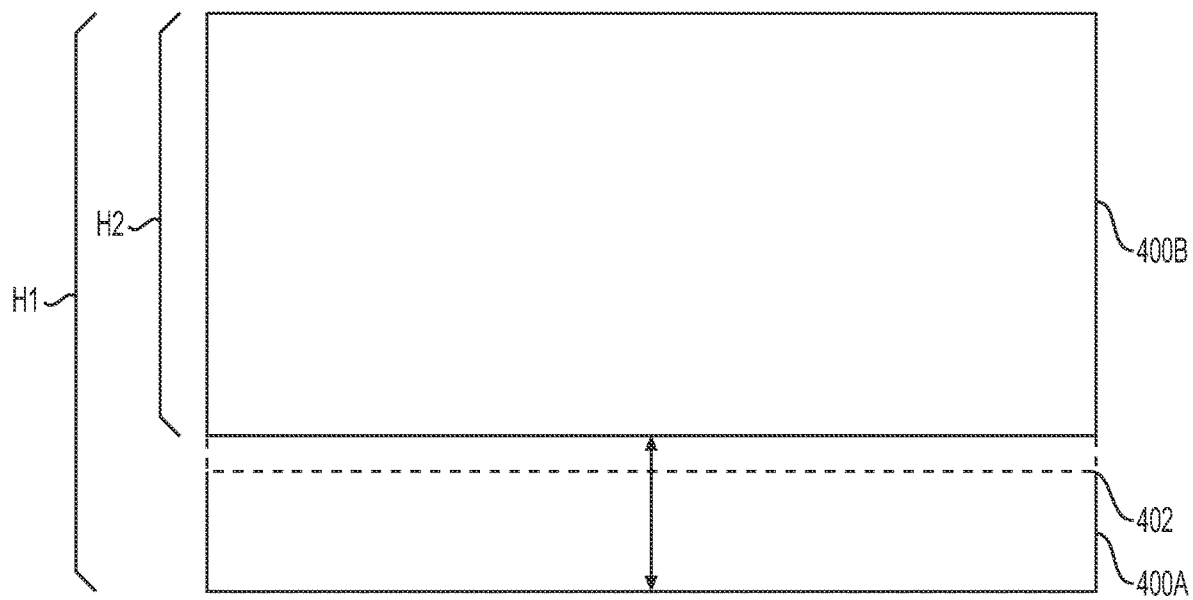
FIG. 4 depicts a diagram for minimum display size threshold determination, according to one or more embodiments.

FIG. 4 depicts a diagram for minimum display size threshold determination, according to an implementation of the disclosed subject matter. As shown, a document 400 may be provided. Document 400 may have a first display size 400A and a second display size 400B. Second display size 400B may be smaller than first display size 400A. Document 400 may switch between first display size 400A and second display size 400B by user input (e.g., resizing via a drag as indicated by the bi-directional arrow in FIG. 4), adjusting an orientation of user device 101, or the like. Alternatively, or in addition, document 400 may be first display size 400A using a first device (e.g., a desktop or laptop computer) and may be second display size 400B using a second device (e.g., a mobile phone).

A minimum display size 402 may be provided by client 102 or may be determined by a machine learning model. The minimum display size 402 may be a pixel based minimum display size or a dimension based minimum display size. For example, the minimum display size may be a height of 800 pixels such that when the height of the document cross 800 pixels (e.g., go below 800 pixels), a visible section and a hidden section is determined. In the example provided in FIG. 4, display size 400A may have a height H1 larger than the minimum display size 402 (e.g., may have a height of 1000 pixels) and display size 400B may have a height H2 smaller than the minimum display size 402 (e.g., may have a height of 700 pixels).

Figure 5A:
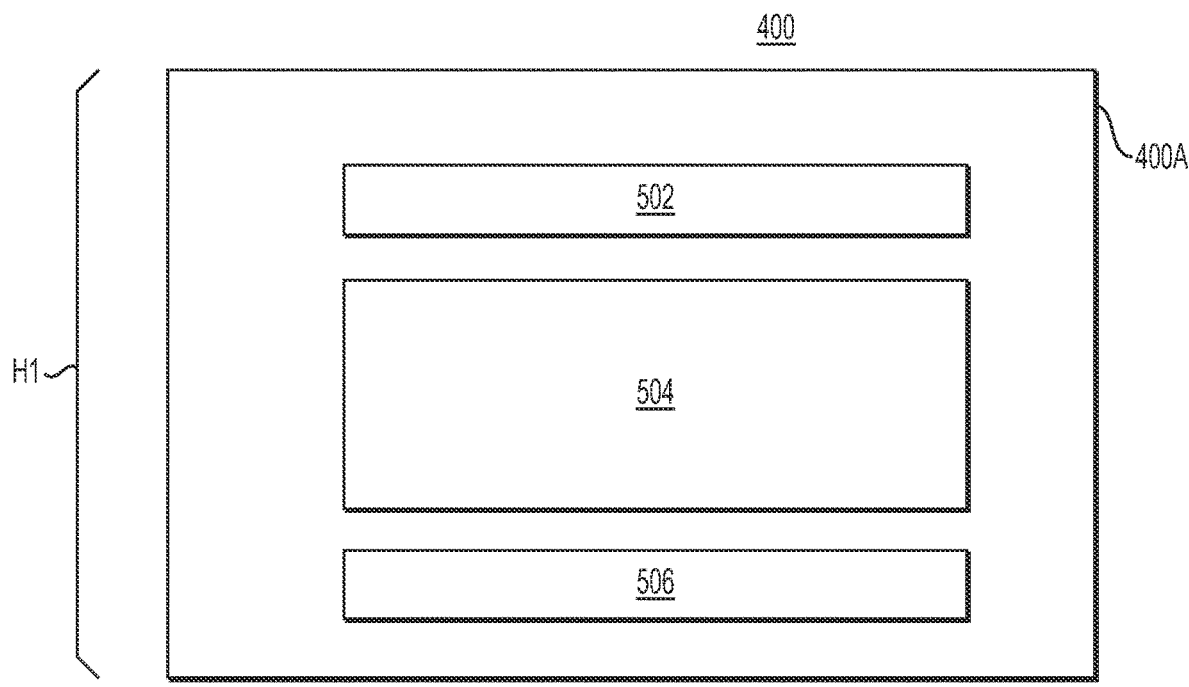
FIG. 5A depicts a diagram for a display size bigger than a minimum display size, according to one or more embodiments.

FIG. 5A shows an example display configuration based on a first display size 400A. As shown, based on the first display size 400A having a height greater than the minimum display size 402 of FIG. 4, each of the containers 502, 504, and 506 may be displayed. Containers 502, 504, and 506 may be displayed in their entirety because the height H1 of display size 400A of document 400 is greater than the minimum display size 402 of 800 pixels.

Figure 5B:
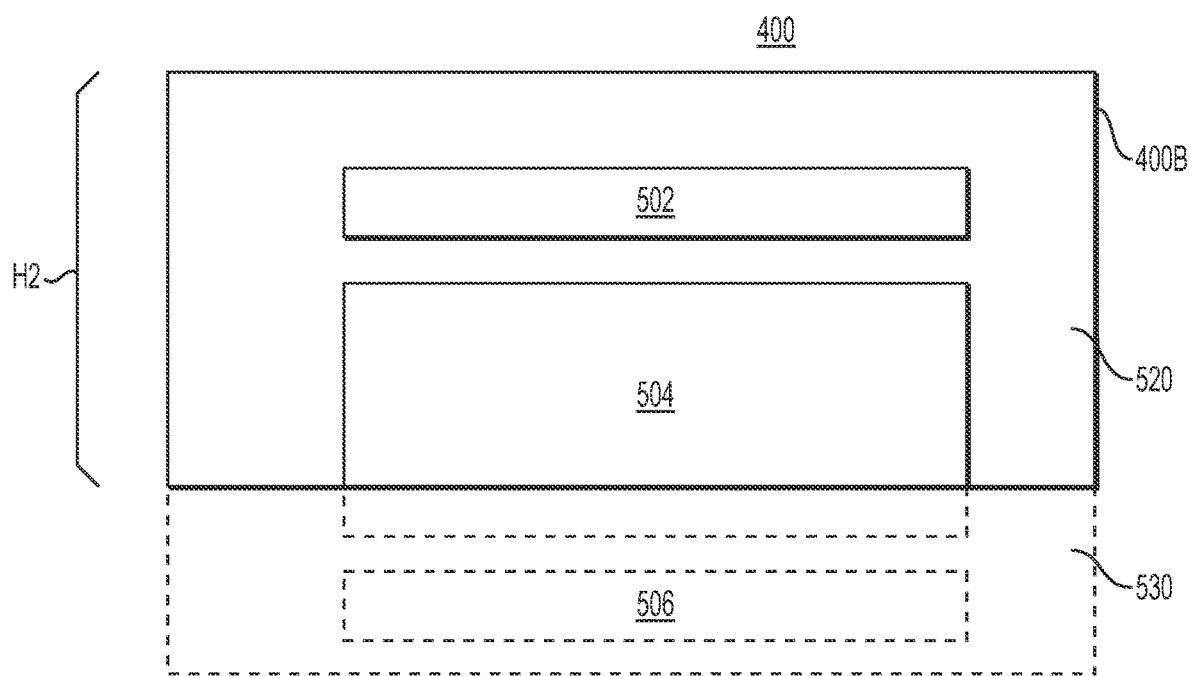
FIG. 5B depicts a diagram for a display size smaller than a minimum display size, according to one or more embodiments.

FIG. 5B depicts an example diagram for a display size 400B smaller than the minimum display size 402. As shown, based on the second display size 400B having a height less than the minimum display size 402 of FIG. 4, only container 502 is shown in its entirety (i.e., the entire container 502 is within a visible section 520), a part of container 504 is displayed (i.e., a portion of container 504 is within visible section 520), a part of container 504 is hidden (i.e., a portion of container 504 is within hidden section 530), and all of container 506 is hidden (i.e., all of container 506 is within hidden section 530).

Figure 5C:
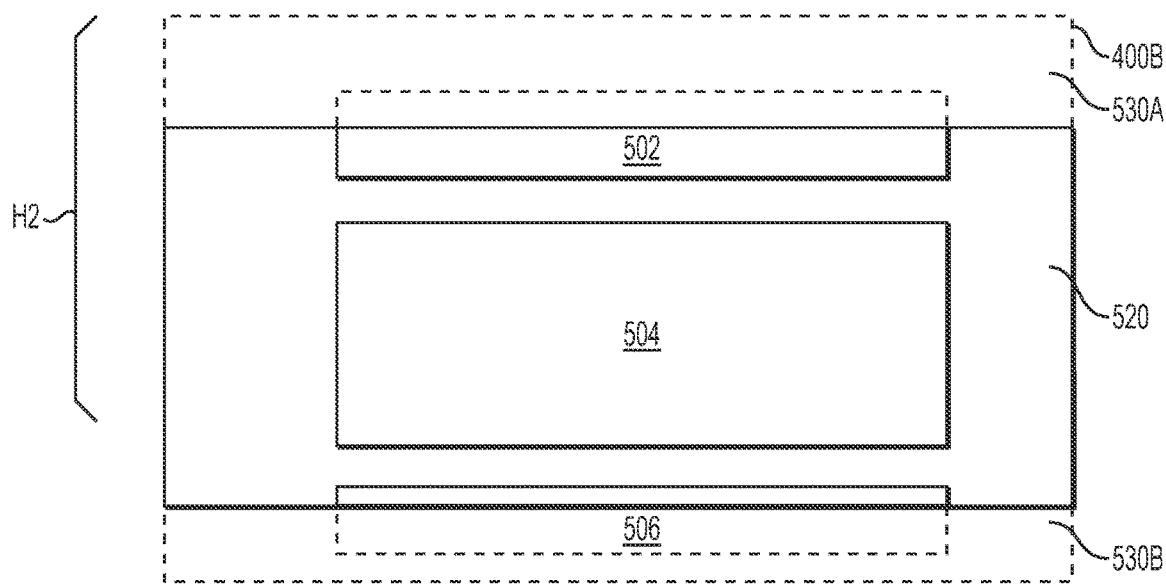
FIG. 5C depicts another diagram for a display size smaller than a minimum display size, according to one or more embodiments.

FIG. 5C depicts another diagram for a display size 400B smaller than the minimum display size 402. The visible section 520, as shown in FIG. 5B may be updated in the diagram depicted in FIG. 5C. For example, a scroll function may cause the visible section 520 to update from the top most part of the document 400, as shown in FIG. 5B, to a section lower than the top most part of the document 400, as shown in FIG. 5C. Accordingly, a different portion of document 400 may be visible in FIG. 5C than in FIG. 5B. As a result, visible section 520 may be provided and a first hidden section 530A and second hidden section 530B may be determined.

As shown, as a result of the first hidden section 530A and second hidden section 530B, a part of container 502 is displayed (i.e., a portion of container 502 is within visible section 520), a part of container 502 is hidden (i.e., a portion of container 502 is within hidden section 530A), all of container 504 is displayed (i.e., all of container 504 is within the visible section 520), a part of container 506 is displayed (i.e., a portion of container 506 is within visible section 520), and a part of container 506 is hidden (i.e., a portion of container 506 is within hidden section 530B).

Figure 6:
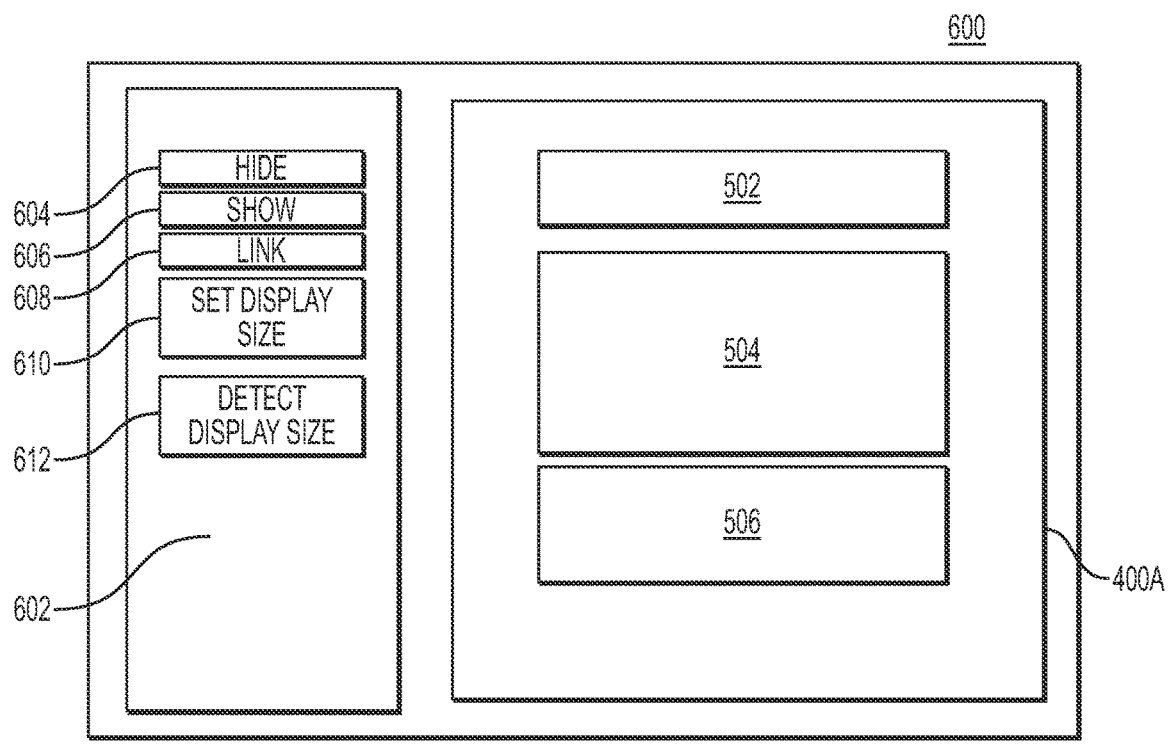
FIG. 6 depicts a diagram of an author portal, according to one or more embodiments.

FIG. 6 depicts a diagram of an author portal 600, according to an implementation of the disclosed subject matter. As shown in FIG. 6, author portal 600 may include an instruction panel 602 that enables an author to design a document via author portal 600. For example, the author may select one or more of hide 604, show 606, link 608, and/or set display size 610 buttons, to design a document. The author may provide a minimum display size using the set display size 610 button. According to an implementation, the author may select one of the first container 502, second container 504, or third container 506 from a portion of author portal 600 and place or otherwise direct the containers on a document canvas.

According to an implementation, the author may size the document canvas to a given size (e.g., display size 400A as shown in the example provided in FIG. 6). The author may size the document prior to designing the document (e.g., placing the containers on the document) or after designing the document.

According to an implementation, the author may select detect display size button 612. Selection of the detect display size button 612 may result in author portal 600 detecting the current display size of the document canvas. The detected size may be provided to author and/or may be stored. The detected size may be designated as the minimum display size or may be modified by the user before being designated as the minimum display size.

Figure 7:
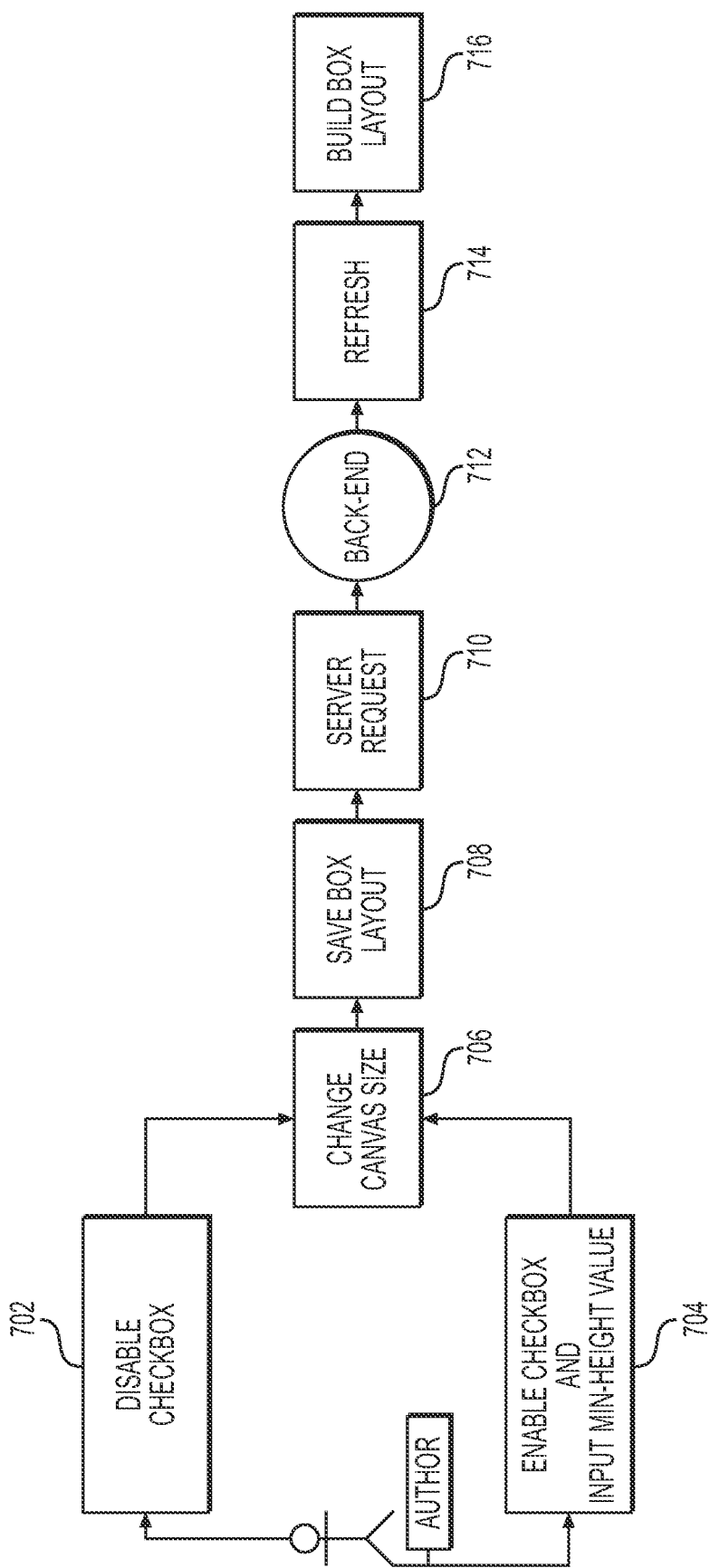
FIG. 7 depicts a flowchart for determining a minimum display size, according to one or more embodiments.

As disclosed herein, an author may update the minimum display size of a document. FIG. 7 shows an example flowchart for defining and/or updating the minimum display size of a document. As shown, at 702 and 704, an author may disable a checkbox to maintain a current minimum display size or enable a checkbox to input a minimum display size (e.g., a minimum height value), via author portal 600. At 706, based on the input at 702 or 704, the document canvas size may be modified and ant 708, the box layout based on the document canvas size may be stored. At 710, a server request may be generated to update the back-end document size and/or layout at 712. At 714, the document on a user end (e.g., via user device 101) may be refreshed to reflect the changes made to the backend at 712. At 716, the document on the user end may be built out based on the refreshed changes at 714.

In general, any process or operation discussed in this disclosure that is understood to be computer-implementable, such as the process illustrated in FIGS. 2, may be performed by one or more processors of a computer system, such any of the systems or devices in the environment of FIG. 1 as described above. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit (CPU), a graphics processing unit (GPU), or any suitable types of processing unit.

Figure 8:
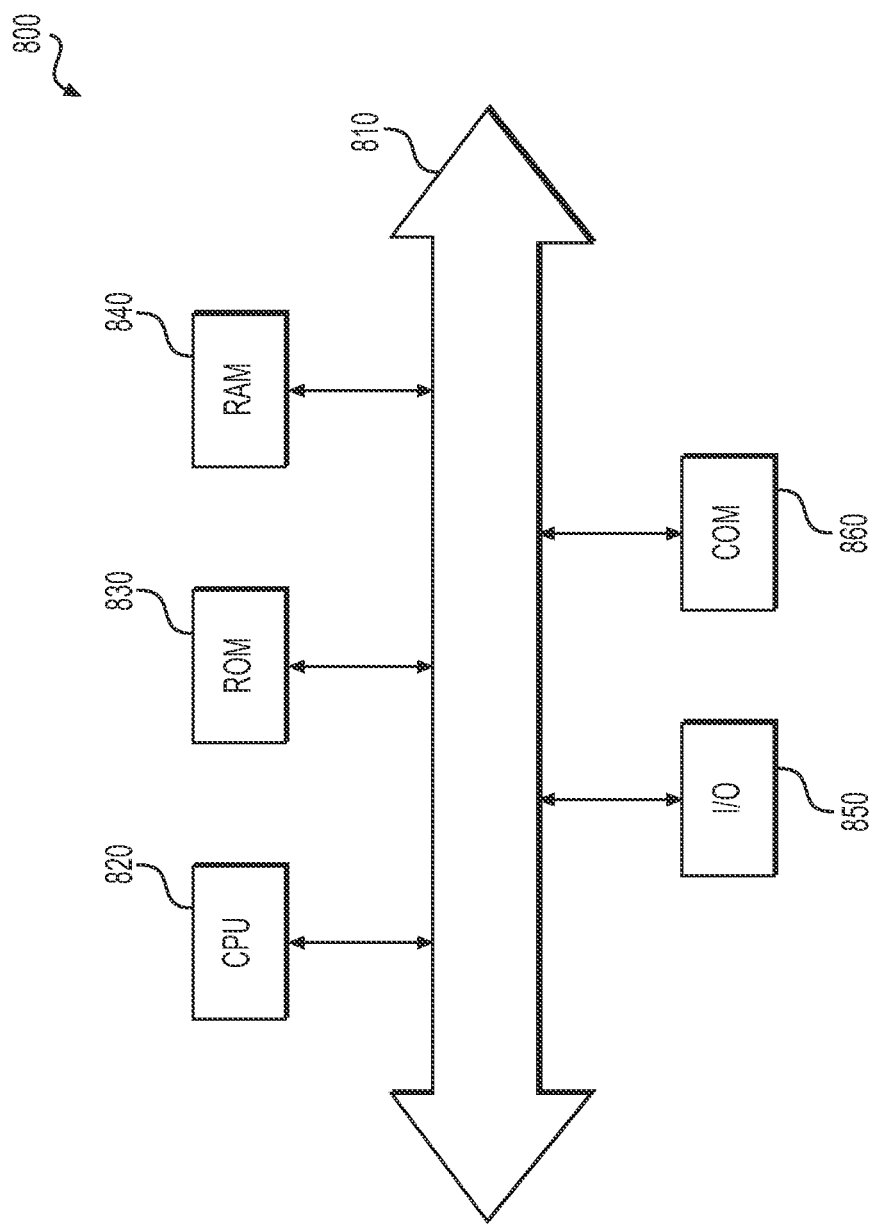
FIG. 8 depicts an example system that may execute techniques presented herein.

FIG. 8 depicts an example system 800 that may execute techniques presented herein. FIG. 8 is a simplified functional block diagram of a computer that may be configured to execute techniques described herein, according to exemplary embodiments of the present disclosure. Specifically, the computer (or "platform" as it may not be a single physical computer infrastructure) may include a data communication interface 860 for packet data communication. The platform may also include a central processing unit ("CPU") 820, in the form of one or more processors, for executing program instructions. The platform may include an internal communication bus 810, and the platform may also include a program storage and/or a data storage for various data files to be processed and/or communicated by the platform such as ROM 830 and RAM 840, although the system 800 may receive programming and data via network communications. The system 800 also may include input and output ports 850 to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

The general discussion of this disclosure provides a brief, general description of a suitable computing environment in which the present disclosure may be implemented. In one embodiment, any of the disclosed systems, methods, and/or graphical user interfaces may be executed by or implemented by a computing system consistent with or similar to that depicted and/or explained in this disclosure. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

The terminology used above may be interpreted in its broadest reasonable manner, even though it is being used in conjunction with a detailed description of certain specific examples of the present disclosure. Indeed, certain terms may even be emphasized above; however, any terminology intended to be interpreted in any restricted manner will be overtly and specifically defined as such in this Detailed Description section. Both the foregoing general description and the detailed description are exemplary and explanatory only and are not restrictive of the features, as claimed.

As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus.

In this disclosure, relative terms, such as, for example, "about," "substantially," "generally," and "approximately" are used to indicate a possible variation of ±10% in a stated value.

The term "exemplary" is used in the sense of "example" rather than "ideal." As used herein, the singular forms "a," "an," and "the" include plural reference unless the context dictates otherwise.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for dynamic document viewing, the method comprising:
   receiving at least one container comprising content viewable via a document;
   receiving a minimum display size for the document via an author portal;
   receiving a frequency of updating a display size of the document determined by a trained machine learning algorithm;
   monitoring the display size of the document according to the received frequency;
   determining that the display size of the document is less than the minimum display size, based on the monitoring;
   determining a visible section and a hidden section of the document based on the display size and based on determining that the display size of the document is less than the minimum display size, the hidden section comprising at least a portion of the at least one container;

displaying the visible section of the document via a display;

activating a scroll feature based on a hidden section size;

receiving an indication to scroll the document in a scroll direction;

updating the visible section to an updated visible section that includes at least a portion of the hidden section, based on the indication to scroll the document in the scroll direction;

displaying the updated visible section of the document via the display;

receiving an updated minimum display size for the document via the author portal; and updating the display of the document via the display based on the updated minimum display size for the document.

2. The method of claim 1, further comprising:

determining that the display size of the document is greater than or equal to the minimum display size, based on the monitoring;

deactivating the scroll feature based on determining that the display size of the document is greater than or equal to the minimum display size; and displaying the document including all of the at least one container, via the display.

3. The method of claim 2, wherein the at least one container is resized based on the display size of the document.

4. The method of claim 1, wherein the author portal is used to design the document.

5. The method of claim 4, wherein the author portal is used to configure a position of the at least one container within the document.

6. The method of claim 4, further comprising:

receiving an indication to determine a current document size at the author portal;

determining the current document size;

updating the minimum display size based on the current document size; and providing the minimum display size upon updating the minimum display size.

7. The method of claim 1, wherein the minimum display size is document specific.

8. The method of claim 1, wherein the at least one container maintains its relative position in the document during display of the visible section and the updated visible section.

9. The method of claim 1, wherein updating the display of the document via the display based on the updated minimum display size for the document comprises:

determining that an updated display size of the document is less than the updated minimum display size;

determining a new visible section and a new hidden section of the document based on the updated display size and based on determining that the updated display size of the document is less than the updated minimum display size, the new hidden section comprising at least a portion of the at least one container;

activating a scroll feature based on a new hidden section size;

displaying the new visible section of the document via the display;

receiving a new indication to scroll the document in the scroll direction;

updating the new visible section to an updated new visible section that includes at least a portion of the new hidden section, based on the new indication to scroll the document in the scroll direction; and displaying the updated new visible section of the document via the display.

10. The method of claim 1, wherein the minimum display size is container agnostic.

11. The method of claim 1, wherein the minimum display size is determined by a machine learning algorithm.

12. A system for dynamic document viewing, the system comprising:

at least one memory storing instructions; and at least one processor executing the instructions to perform operations, the operations comprising:

receiving at least one container comprising content viewable via a document;

receiving a minimum display size for the document via an author portal;

receiving a frequency of updating a display size of the document determined by a trained machine learning algorithm;

monitoring the display size of the document according to the received frequency;

determining that the display size of the document is less than the minimum display size, based on the monitoring;

determining a visible section and a hidden section of the document based on the display size and based on determining that the display size of the document is less than the minimum display size, the hidden section comprising at least a portion of the at least one container;

displaying the visible section of the document via a display;

activating a scroll feature based on a hidden section size;

receiving an indication to scroll the document in a scroll direction;

updating the visible section to an updated visible section that includes at least a portion of the hidden section, based on the indication to scroll the document in the scroll direction;

displaying the updated visible section of the document via the display;

receiving an updated minimum display size for the document via the author portal; and updating the display of the document via the display based on the updated minimum display size for the document.

13. The system of claim 12, wherein the operations further comprise:

determining that the display size of the document is greater than or equal to the minimum display size, based on the monitoring;

deactivating the scroll feature based on determining that the display size of the document is greater than or equal to the minimum display size; and displaying the document including all of the at least one container, via the display.

14. The system of claim 13, wherein the at least one container is resized based on the display size of the document.

15. The system of claim 12, wherein the minimum display size of the document is determined by:

receiving an indication to determine a current document size at the author portal;

determining the current document size;

determining the minimum display size based on the current document size; and providing the minimum display size upon determining the minimum display size.

16. The system of claim 12, wherein the at least one container maintains its relative position in the document during display of the visible section and the updated visible section.

17. The system of claim 12, wherein updating the display of the document via the display based on the updated minimum display size for the document comprises:

determining that an updated display size of the document is less than the updated minimum display size;

determining a new visible section and a new hidden section of the document based on the updated display size and based on determining that the updated display size of the document is less than the updated minimum display size, the new hidden section comprising at least a portion of the at least one container;

activating a scroll feature based on a new hidden section size;

displaying the new visible section of the document via the display;

receiving a new indication to scroll the document in the scroll direction;

updating the new visible section to an updated new visible section that includes at least a portion of the new hidden section, based on the new indication to scroll the document in the scroll direction; and displaying the updated new visible section of the document via the display.

18. A non-transitory computer-readable medium storing instructions that, when executed by a processor, cause the processor to perform operations, the operations comprising:

receiving at least one container comprising content viewable via a document;

receiving a minimum display size for the document via an author portal;

receiving a frequency of updating a display size of the document determined by a trained machine learning algorithm;

monitoring the display size of the document according to the received frequency;

determining that the display size of the document is less than the minimum display size, based on the monitoring;

determining a visible section and a hidden section of the document based on the display size and based on determining that the display size of the document is less than the minimum display size, the hidden section comprising at least a portion of the at least one container;

displaying the visible section of the document via a display;

activating a scroll feature based on a hidden section size;

receiving an indication to scroll the document in a scroll direction;

updating the visible section to an updated visible section that includes at least a portion of the hidden section, based on the indication to scroll the document in the scroll direction;

displaying the updated visible section of the document via the display;

receiving an updated minimum display size for the document via the author portal; and updating the display of the document via the display based on the updated minimum display size for the document.

* * * * *